US006814908B2

(12) United States Patent
Marazita (10) Patent No.: US 6,814,908 B2
(45) Date of Patent: Nov. 9, 2004

(54) INJECTION MOLDING MACHINE AND CONTROLLER

(76) Inventor: Jose R. Marazita, 1723 Raven Oak Ct., Katy, TX (US) 77450

( * ) Notice: Subject to any disclaimer, the term of this patent is extended or adjusted under 35 U.S.C. 154(b) by 0 days.

(21) Appl. No.: 10/283,425

(22) Filed: Oct. 24, 2002

(65) Prior Publication Data

US 2004/0081717 A1 Apr. 29, 2004

(51) Int. Cl.$^7$ .............................................. B29C 45/76
(52) U.S. Cl. ...................... 264/40.5; 264/102; 425/145; 425/150
(58) Field of Search .............................. 264/40.1, 40.5, 264/40.7, 102, 328.7, 328.11; 425/145, 147, 149, 150, 546, 557, 575, 589, 595, 587

(56) References Cited

U.S. PATENT DOCUMENTS

| | | | |
|---|---|---|---|
| 4,988,273 A | | 1/1991 | Faig et al. |
| 5,052,909 A | | 10/1991 | Hertzer et al. |
| 5,500,166 A | * | 3/1996 | Sasaki et al. ............ 264/328.7 |
| 5,756,019 A | | 5/1998 | Nakazawa et al. |
| 5,772,932 A | * | 6/1998 | Kamiguchi et al. ........ 264/40.5 |
| 6,011,376 A | | 1/2000 | O'Bryan et al. |
| 6,299,427 B1 | * | 10/2001 | Bulgrin et al. .............. 425/145 |

OTHER PUBLICATIONS

Rosato, Donald V. et al., Injection Molidng Handbook, 2$^{nd}$ edition, 1995, pp. 285–290.*

* cited by examiner

Primary Examiner—Jill L. Heitbrink
(74) Attorney, Agent, or Firm—Loren G. Helmreich; Browning Bushman, P.C.

(57) ABSTRACT

An injection molding machine 10 utilizes a two part mold to produce a molded part. A machine includes a clamping mechanism 20 including one or more clamping cylinders 22 for applying a mold clamping force to the two part mold, an injection mechanism 30 for plasticizing material and injecting the plasticized material into the closed mold, and a controller 50 for powering the molding machine hydraulic system 52. In one embodiment, clamping pressure is automatically increased or decreased to allow air to escape as plasticized material flows into the mold cavity. In another embodiment, the controller provides a minimum clamp pressure to maintain the plasticized material within the mold as a function of fluid injection pressure to the screw member of the injection system.

31 Claims, 6 Drawing Sheets

| | INJECTION | | | CLAMP | |
|---|---|---|---|---|---|
| | POSITION IN. | SPEED RPM | PRESSURE PSI | CLAMP PRESSURE PSI | |
| SHOOT SIZE | 10.50 | | | | |
| STEP #1 | 2.00 | 1200 | 1500 | 500 | 900 |
| STEP #2 | 1.50 | 1000 | 1200 | 600 | |
| STEP #3 | 1.00 | 900 | 1000 | 900 | CLAMP PRESSURE ACTUAL PSI. |
| STEP #4 | 0.80 | 750 | 850 | 1000 | 1000 |
| STEP #5 | 0.50 | 600 | 800 | 1250 | |
| STEP #6 | 0.30 | 550 | 750 | 1400 | SCREW POSITION ACTUAL IN. |
| PACK TMR 2.0 seg. | | 500 | 1200 | 1600 | 3.10 |
| HOLD TMR 1.0 seg. | | 350 | 400 | 600 | MENU |

FIG. 3

| | POSITION IN. | SPEED RPM | | CLAMP PRESSURE PSI |
|---|---|---|---|---|
| SHOOT SIZE | 10.50 | | | |
| STEP #1 | 2.00 | 800 | 750 | 500 |
| STEP #2 | 6.00 | 850 | 800 | 400 |
| STEP #3 | 8.00 | 900 | 850 | 300 |
| STEP #4 | 9.00 | 900 | 950 | 200 |
| STEP #5 | 9.50 | 700 | 700 | 100 |
| PULL BACK | 0.80 | 500 | 400 | 0 |

SCREW RECOVERY CLAMP

850

CLAMP PRESSURE ACTUAL PSI

300

SCREW POSITION ACTUAL IN.

6.50

MENU

FIG. 4

ENERGY MAGNAMENT

| | | | | | |
|---|---|---|---|---|---|
| MOLD # | 1231 | # OF CAVITIES | 4 | Kg. PER SHOT | 0.098 |
| MATERIAL | PP | Kg. PER HR. | 22.04 | Kg. PER DAY | 528.87 |
| PRICE KWH $ | 0.10 | PRODUCCION RUN | 30,000 | | |
| KWH ACTUAL | 0.18 | | | CYCLE TIME SEC. | 16.01 |
| BEST KWH PER CICLE | 0.03 | KWH PER RUN | 1089 | | |
| DIFERENCE ACTUAL/BEST | 0.15 | | | CYCLES PER HR | 224.86 |
| KWH PER SHOT | 0.036 | KWH PER PART | .009 | | |
| COST PER SHOT $ | 0.0036 | | | CYCLES PER DAY | 5397 |
| KWH PER DAY | 196.32 | KWH PER 1000 PARTS | 9.075 | | |
| COST PER DAY $ | 19.36 | | | PARTS PER HR | 899.44 |
| | | COST PER Kg $ | 0.037 | | |

INJECTION MOLDING MACHINE AND CONTROLLER

FIELD OF THE INVENTION

The present invention relates to an injection molding machine for producing a molded part by injection of a plasticized material into a two part mold. More particularly, the present invention relates to an improved injection molding machine controller coupled with the hydraulic system for operating the molding machine more efficiently.

BACKGROUND OF THE INVENTION

Injection molding machines have been increasingly used in the last twenty years for molding a part by injection of a material into a two part mold. An injection molding machine converts a plastic or rubber material from one form or shape to another. Most plastic molding materials initially are in pellet form, but other materials are in strip, powder or webbed form. A molding machine conventionally includes a clamping mechanism including one or more clamping cylinders for applying a mold clamping force to the two part (or multi-part) mold and for moving the mold parts apart to open the mold, and an injection mechanism for plasticizing the material and injecting the plasticized material into the closed mold to form the molded part. The injection mechanism conventionally includes a screw member rotatable and axially moveable within a barrel having a discharge end in fluid communication with the closed mold. The material that enters the molding machine is converted to a molten state partially by heater bands applied to the injection barrel, but primarily by frictional heat generated by the screw rotation. The screw rotation thus changes the solid material into a molten and homogenous mix and transfers the molten material to the front of the injection barrel in preparation for injecting the molten material into a mold once the mold is closed and pressure has built up between the mold halves by the mold clamping mechanism. A hydraulic system is provided for powering the clamping mechanism, and typically also the injection mechanism.

During operation, the moving platen of the molding machine holding the ejection half of the mold closes to contact the injection half of the mold. At this stage, high pressure built up by the clamping mechanism presses the mold halves together. High pressure is built up and a signal is generated by a pressure sensor or limit switch to initiate the injection of the material by the screw. Air is trapped in the cavities of the closed mold that is shut at high pressure. Consequently, the injection speed must be reduced to allow the trapped air to be forced slowly about the ejector pin ports (pin clearance) or through machined vent grooves in the mold. In many applications, even slowing the injection speed will not mold a good part, since the trapped air creates burn marks due to high pressure compressing the trapped air and creating a void or short part, which may also be due to trapped air.

When the injection is completed, the screw rotation will conventionally start at full hydraulic pressure applied to the mold, with the hydraulic motor driving the screw. The screw rotation speed is conventionally controlled by a flow control valve. The screw rotation may end at a preset value established by an electrical switch or by a linear potentiometer. When the screw rotation ends, the screw decompression starts by linear movement or pull back of the screw. The stroke of the pull back may be controlled by a limit switch or a linear potentiometer. At the end of the screw pull back, the clamp may still be closed for a predetermined time to allow for the molded part to cool. When the cooling time ends, the mold opens and the part is ejected. The machine is now ready to start a new cycle.

The operation of a molding machine as described above is conventionally driven by an electric motor coupled to a hydraulic pump or pumps that pump the oil from a tank, deliver the oil to the different actuators of the molding machine, and return the oil to the tank. Most machines use AC motors with fixed volume pumps or a combination of fixed and variable pumps. Both the pumps and the motors run at a fixed speed regardless of the load requirement, which wastes energy.

U.S. Pat. No. 5,756,019 discloses an injection molding machine with a conventional screw member rotatable within a barrel, with a supplying hopper at one end and a port into the closed mold at the other end. The mold clamping force is controlled in response to molding data and position sensors for the screw member and the clamping mechanism during injection. The injection speed is controlled, so that the detected injection pressure gradually increases from the initiation of injection. This detected pressure, the position sensor data, and the molding data are input to a controller which reduces the mold clamping force to a minimum value, thereby reducing power consumption. A closed loop hydraulic system is controlled for operating the screw, and another closed loop hydraulic system is provided for the clamp. Injection molding is the most widely used process for the production of plastic parts. The molding machine ideally produces parts at the lowest possible temperatures, at the lowest applied pressures, in the shortest possible times, and with the lowest energy consumption. Present day molding machines are highly productive, but the molding operation generally faces two significant problems: (1) evacuating the air trapped in the mold cavities in which the mold material is injected, and (2) high energy consumption. Air trapped in mold slows down the injection process, taking longer for a part to fill out. Higher material temperatures and higher mold temperatures are required to keep the material flowing to fill out the part. Higher temperatures in the material and the mold require longer cycle time, thereby requiring more cooling for the mold, higher energy consumption, and longer injection time periods.

U.S. Pat. No. 5,756,019 discloses an injection molding machine with a conventional screw member rotatable within a barrel, with a supplying hopper at one end and a port into the closed mold at the other end. The mold clamping force is controlled in response to molding data and position sensors for the screw member and the clamping mechanism during injection. The injection speed is controlled, so that the detected injection pressure gradually increases from the initiation of injection. This detected pressure, the position sensor data, and the molding data are input to a controller which reduces the mold clamping force to a minimum value, thereby reducing power consumption. A closed loop hydraulic system is controlled for operating the screw, and another closed loop hydraulic system is provided for the clamp. The '019 patent detects injection pressure at a flow control valve, so that the mold clamping force is controlled, along with other parameters, by the detected injection pressure. Detected pressure may, for example, then be multiplied by a factor to determine the clamping pressure. The position sensor is used to detect the screw position, and another position sensor is used to detect the position of the movable mold. A pressure detector monitors the injection pressure to the screw, while another pressure detector monitors the mold clamp pressure. All of this information is input to a controller, and inherently the system as shown in FIG. 5 of this patent takes a significant amount of time, e.g., in the range from 15 to 50 milliseconds, between a signal being sensed by a sensor and the time the controller operates a molding machine component in response to that sensed signal, and is subject to considerable variations from cycle to cycle. Systems which are based on multiple sensors and perform multiple functions may require a time lag of over 100 milliseconds or more between a sensed signal and a resulting action. Injection molding machines today are able to produce a part of varying size during injection cycle which may take no more than one second, the time delay between sensed signals and the resulting action according to the prior art techniques thus does not allow the injection mold operation to be performed in an efficient manner since the time delay contributes to its inefficient operation. Accordingly, the injection time must be increased and the injection speed reduced in view of the control procedures, which then decreases the efficiency and increased cost.

Injection molding machines have always sought to control machine operation to produce the part faster and thus more efficiently, and also to produce the part using less energy. U.S. Pat. No. 4,988,233 discloses an injection molding machine which uses a brushless DC motor. The patent also discloses a molding machine controller for operating the molding machine during the full injection cycle.

U.S. Pat. No. 6,011,376 discloses an injection mold controller which verifies the linear position of a machine element as detected by a transducer. The controller may be used to detect faulty machine conditions and provide machine malfunction or damage information.

U.S. Pat. No. 5,052,909 discloses a controller designed to conserve energy use of the injection molding machine. The controller outputs driving signals to adjust the speed of the motor so that the flow delivered by the pump substantially matches the hydraulic demand imposed during each phase of the injection. A variable displacement pump is connecting to a fast responding pump control for selectively carrying out pressure compensation or flow compensation. The '909 Patent discusses the typical operation of a molding machine, listing the phases of the injection cycle which require different hydraulic pressures and/or flow.

Many injection molding machines still use relatively expensive and noisy variable volume pumps, with swatch plates and pump controls which have an adverse effect on the overall efficiency on the injection molding process. During the back-out screw rotation phase of the injection cycle pressure to the screw conventionally is not controlled, and only flow to the screw is controlled with a flow control valve, thereby again wasting valuable energy.

The disadvantages of the prior art are overcome by the present invention, and an improved molding machine and a molding machine controller is provided which may be used to produce molded parts more efficiently, and in most cases using substantially less energy.

SUMMARY OF THE INVENTION

An injection molding machine is provided for producing a molded part by injection of a material into a two part mold. A clamping mechanism conventionally includes one or more clamping cylinders for applying a variable mold clamping force to the two part mold, and also for moving the mold parts apart to open the mold. The injection molding machine includes an injection mechanism for plasticizing material and injecting the plasticized material into the closed mold cavity, thereby forming the molded part. The injection mechanism includes a screw member rotatable and axially moveable within a barrel having a discharge end in fluid communication with the closed mold cavity. In one embodiment, the controller coupled to the hydraulic system supplies hydraulic pressure to operate the clamping mechanism, and automatically increases or decreases clamping pressure in response to axial movement of the screw member within the barrel of the injection mechanism, such that air escapes from the mold cavity as a plasticized material flows into the mold. In another embodiment, the controller may directly control one or more variable speed electric motors which drive the injection mechanism and/or the clamping mechanism.

The controller may coupled with a hydraulic system which powers both the clamping mechanism and the injection mechanism, with the controller providing a minimum clamp pressure to maintain plasticized material within the mold cavity as a function of the position of the screw member.

The present invention provides a high performance, low power consumption, hydraulically powered plastic or rubber molding machine, such as an injection molding machine, an injection blow molding machine, an injection stretch blow molding machine, and a structural foam molding machine. The molding machine may incorporate a fast injection speed, a fast air evacuation from the mold, low energy consumption, low molding temperatures, low clamp pressure, low screw rotation pressure, low cycle times, and better quality parts. The molding machine of this invention may intelligently incorporate a PC or a PLC based controls, with either simple or complex algorithms in the controller controlling hydraulic forces to operate the molding machine. Proportional pressure control valves, fixed volume pumps, and variable speed electric motor(s), preferable of the brushless DC rare earth type with sinusoidal wave forms drives, may be used to enhance efficiency and reduce costs. These motors have a smaller frame size, and commutated sinusoidally are highly efficient, generate low heat, and have a smoother and more accurate operation than commercially alternative motors. DC rare earth motors are also built to rapidly accelerate and decelerate, which is highly desirable when the motor control operation of the hydraulically powered components of the injection molding machine.

Fast air evacuation from the mold may be accomplished simultaneously while injecting the plastic material into the mold, and maintaining the minimum clamp pressure applied to the mold halves, both 1) during injection and during the pack and hold portions of the injection cycle, and 2) during the screw recovery portion of the injection cycle. The controller may also minimize energy costs by minimizing screw rotation, torque and speed used to soften the plastic into a homogeneous flowable mass ready to be injected in the mold during the next injection.

It is a feature of the invention that the molding machine is provided with a controller for regulating the hydraulic system which powers the clamping mechanism and/or the injection mechanism, or the electrical drive system which powers the clamping mechanism and/or the injection mechanism. A simple and highly reliable and precise screw axial position sensor may output signals to the controller to automatically increase clamping pressure as the molten material is injected in the mold. The controller may thus anticipate the minimum clamping pressure required to satisfactorily retain the plasticized material in the mold as a function of the position of the screw during an initial injection portion of the cycle. During this initial injection portion of the cycle, a majority of the plasticized material may flow into the mold cavity. Air may be bled through a gap between mating faces of the two part mold, or air may be bled from the gap between the ID of an ejector port and the OD of an ejector pin.

During a final injection portion of the cycle, control of clamping pressure may be a function of time, such that plasticized material preferably packs and solidifies in the two-part mold during the final injection portion of the cycle.

As yet another feature, the controller may regulate hydraulic pressure at different stages of the cycle to axially move the screw, and hydraulic pressure to the motor which rotates the screw, both in response to the axial screw position sensor, to achieve minimum hydraulic pressure to axially move the screw within the time desired, and to achieve the minimum screw rotation rate required to plasticize the material to the characteristics desired for injection into the mold.

Still another feature of the invention is that the controller may set clamp pressure at a selected value higher or lower than hydraulic injection pressure during portions of an injection cycle. The controller may automatically increase and decrease hydraulic pressure during portions of the injection cycle according to preselected values.

A significant advantage of the present invention is that the efficiency of the molding operation may be increased utilizing the controller of the present invention. A related advantage is that less energy is required to mold a part than with prior art equipment.

Another significant advantage of the present invention is that the molding machine may allow an energy management and/or efficient management information to be displayed to the molding machine operator on a chart to enhance the performance and reduce the costs of the molding operation.

Another advantage of the invention is that the controller may power the hydraulic system or the electrical drive system of a molding machine.

These and further objects, features and advantages of the present invention will become apparent from the following detailed description, which makes reference to the figures in the accompanying drawings.

DETAILED DESCRIPTION OF THE PREFERRED EMBODIMENTS

The injection mold process is a combination of art and science. It takes an experienced molding set up person to get a particular mold running properly in a particular molding machine. These individuals work with the different controls of the machine, the mold, and other auxiliary equipment relating to the molding process to produce the best possible parts at the lowest possible cost. Molding machines are thus preferably supplied with all the necessary controls for set up persons to accomplish their work.

Figure 1:
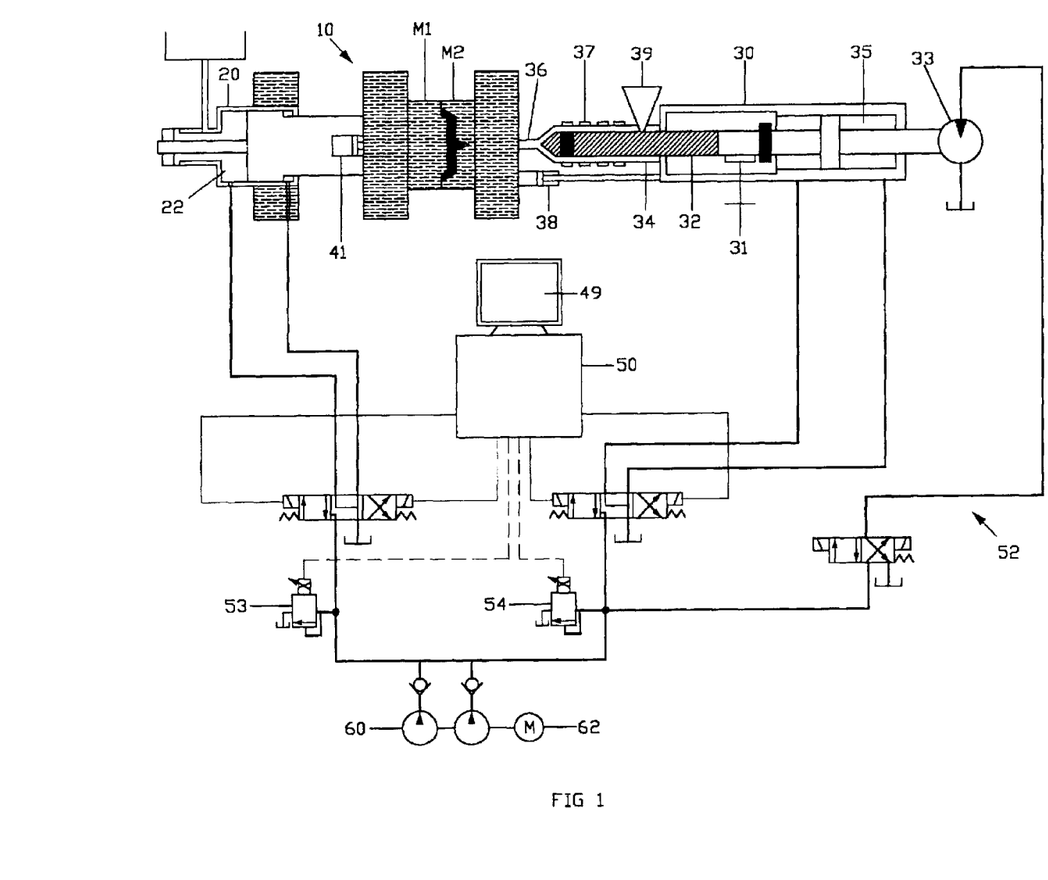
FIG. 1 conceptually depicts an injection molding machine with a clamping mechanism and an injection mechanism. The hydraulic system is schematically illustrated, along with operator interface and control.
Figure 2:
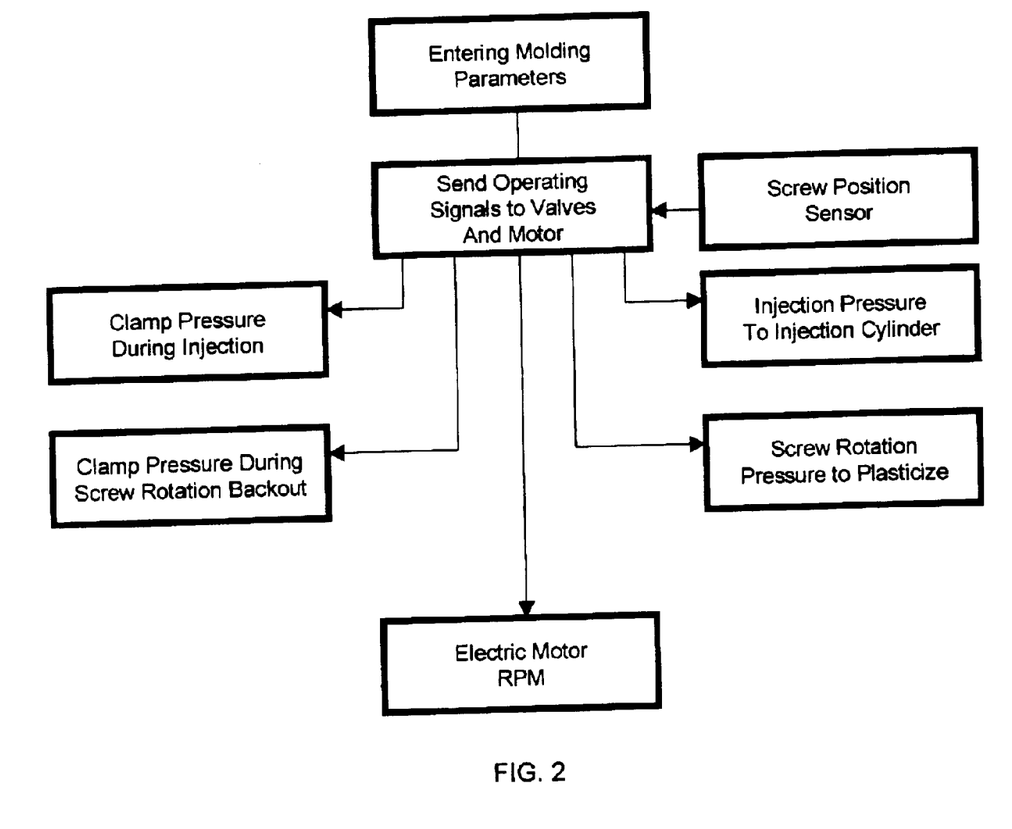
FIG. 2 is a block diagram of the molding machine operating function during the injection portion of the cycle and during the back-out screw rotation portion of the cycle.
Figure 3:
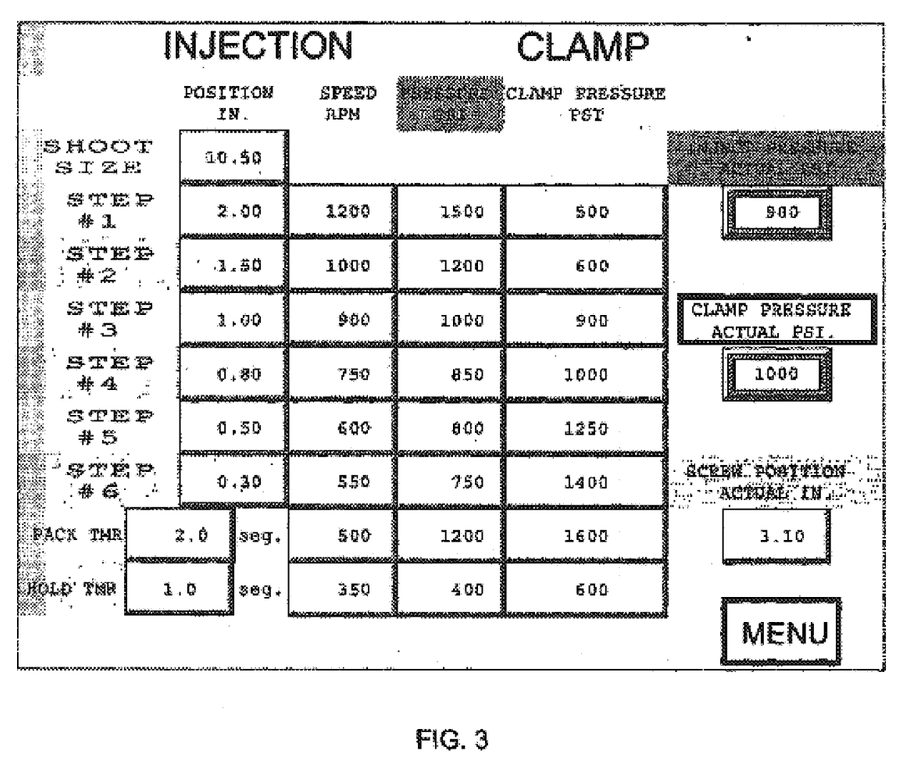
FIG. 3 depicts exemplary data selectively input by a set up operator applying the position of the screw during the injection phase, a motor rpm for the hydraulic pump, the injection pressure limit with that motor speed, and the clamping pressure corresponding to that step of the injection operation.

Injection molding machine 10 is schematically shown in FIG. 1 for producing a molded part by injection of material into a two part mold, the mold parts designated as M1, M2. The mold may have more than two parts (multi-part mold), but two parts are necessary. The mold clamping mechanism includes at least one clamping cylinder 20 for applying a mold clamping force to the two part mold and for moving the mold parts apart to open the mold. Injection mechanism 30 is provided for plasticizing material and injecting the plasticized material into a closed mold to form a molded part. The injection mechanism includes a screw member 32 rotatable within and axially moveable within a tubular barrel 34 having a discharge end 36 for fluid communication with the closed mold. Hydraulic motor 33 thus rotates the screw 32, while hydraulic cylinder 35 axially moves the screw during the injection portion of the cycle.

FIG. 1 also schematically illustrates a hydraulic system for powering the clamping mechanism and the injection mechanism. The controller 50 is preferably coupled with the hydraulic power system 52 for supplying hydraulic fluid to operate both the clamping mechanism 20 and the injection mechanism 30. The controller 50 preferably regulates the hydraulic power system 52 to supply hydraulic pressure to operate both the clamping mechanism and the injection mechanism, with the controller providing a minimum clamp pressure for maintaining the plasticized material within the mold cavity and the minimum fluid injection pressure to axially move the screw member, with fluid pressure to both the clamping mechanism and the injection mechanism being controlled by controller 50 as a function of a signal from the axial screw position sensor. The controller may thus set hydraulic clamp pressure at a selected value higher or lower than the selected hydraulic injection pressure during portions of the injection cycle, and may automatically increase and decrease hydraulic pressure during portions of an injection cycle according to preselected values. The operation of the clamping mechanism and the injection mechanism is, however, directly or indirectly preferably controlled during the injection portion of the cycle in response to the axial screw position sensor. In some applications, only the clamping pressure may be controlled by controller 50 in response to the axial screw position sensor, and the injection mechanism may be controlled by a separate controller or by controller 50 independent of the axial screw position.

According to a preferred embodiment, the controller automatically increases clamping pressure in response to axial movement of the screw member within the barrel of the injection mechanism, such that air escapes from the mold cavity as a plasticized material flows into the mold cavity. The controller may thus anticipate the minimum clamping pressure required to satisfactorily retain the plasticized material in the mold, with this determination being made as a function of the axial position of the screw within the barrel. Since the hydraulic system is coupled to the injection mechanism, fluid pressure to the cylinder which controls axial movement of the screw may also be provided by the controller to automatically vary the injection pressure as a function of the axial position of the screw.

Since clamping pressure is low when the plasticized material is initially injected into the mold, most of the air may be bled through a gap between the mating faces of the two part mold, thereby desirably eliminating air from the mold and reducing the likelihood of the molded part "burning." A smaller amount of air may also be bled through one or more ejector ports in the mold cavity, which inherently have an ID or cross-section greater than an OD or cross-section of a respective ejector pin. This elimination of most of the air from the mold cavity also reduces the energy and time required to inject the plasticized material into the mold. The molding machine of this invention may thus incorporate a fast air evacuating system during injection, thereby simultaneously obtaining faster injection rates, lower horsepower motor, and lower energy consumption, particularly during injection portion of the cycle the screw return portion of the cycle, and the screw rotation for plasticizing portion of the cycle. The clamp pressure is thus closely controlled so that air will vent from the mold as plasticized material is injected into the mold. Clamp pressure will thus increase while injecting the plasticized material into the mold, and air will escape through the faces of the mold or other throughports in the mold. By evacuating the air faster, the quality of parts is significantly increased by reducing or eliminating weld lines. Burn marks may also be significantly reduced or eliminated. By operating the injection molding machine at a reduced injection pressure and clamp pressure, less energy is used. The controller also may significantly reduce wear on the mold and the molding machine parts. In some applications, the controller may control clamp pressure to an initial value, then may briefly lower clamping pressure before increasing the clamping pressure while still within the initial fluid injection portion of the cycle. The clamping pressure is thus normally increased during the initial injection portion of the cycle, but in some cases may be increased, decreased, then increased again or otherwise varied depending on the desires of the operator and the particulars of the part being molded.

Clamp pressure may thus be maintained at a minimum value required with respect to the injection pressure so as to maintain the desired pressure relationship between the pressure to the clamping mechanism and the pressure to the injection mechanism. The clamp hydraulic pressure could be preset higher, lower, or equal to the hydraulic injection pressure during various segments of the injection cycle. The controller may automatically control the regulated pressure increases and decreases during various stages of the injection cycle according to preset values.

The required clamping force during the final injection portion of the cycle will vary depending on several factors. Final clamping pressure typically is in the range of 3–5 tons per square inch of projected area of the molded part, although clamping pressure of one ton or less per square inch of the projected area of the molded part may be used for some parts, and a clamping pressure of more than 5 tons per square inch is also used on other molded parts.

Fast and precise molding machine operation may be obtained with one or more reliable and low cost fixed volume pumps 60 driven by a variable speed electric motor 62, and preferably a brushless DC rare earth motor with a sinusoidal wave form drive. These types of motors have a relatively small frame size, thereby making them ideal for molding machines. Compared to conventional motors, the brushless motor commutated sinusoidally is more efficient, generates less heat, is smoother and more accurate in operation, and is designed to rapidly accelerate and decelerate motor speed. In a preferred embodiment, a controller 50 regulates a DC motor 62 which drives a positive displacement pump 60, e.g., a piston pump, or preferably a vane pump. By controlling the output of the electric motor, the hydraulic system volume is controlled to the minimum volume necessary to obtain the desired function at each stage of the injection cycle.

Rather than achieving hydraulic fluid volume control through valving or restrictions, the injection molding machine of the present invention preferably uses a variable rpm electric motor(s), so that the speed of the motor is varied during the injection cycle. A smaller pump may thus be used to obtain the required fluid flow rate and pressure at different locations in the hydraulic system. A variable speed electric motor and positive displacement pump preferably are controlled in response to the controller 50 so that the motor speed and thus the volume of fluid pumped are controlled. The controller of the present invention significantly minimizes the power required to reliably operate the molding machine by varying the RPM of the electric motor to the minimum speed required to obtain the necessary flow of hydraulic fluid to the various components being hydraulically powered within the system at different stages of the molding cycle. The electric motor may thus be set to a minimum flow output required to operate the clamping mechanism at one stage of the molding cycle, with a control valve then being used to control fluid pressure at that flow rate to other components of the system, such as the injection system. At other stages of the molding cycle, the pressure may be controlled to both the hydraulic system and the injection system, and still in other cases the motor speed may be reduced to the minimum required for the injection system, and the pressure control valve then used to control pressure to the hydraulic clamping system.

By using a commercial available and precise position sensor 31, the axial position of the screw during the injection stroke in the barrel may be reliably input to the controller. Using a clamping pressure no higher than that necessary to satisfactorily maintain the injection material in the mold, part quality is increased and energy is reduced. Various techniques may also be used to reduce clamping pressure after the injection phase, i.e., during the cooling phase, and also during the subsequent part ejection phase where ejector pins conventionally eject the molded part from the mold. An ejector cylinder 41 may be provided for ejecting the part from the mold.

Injector screw rotation is preferably used to plasticize the material, which conventionally reaches the injection mechanism from a hopper 39. The injection mechanism may also be heated with electrical heating bands 37, although the primary energy input which plasticizes the material will likely be the friction of the material with the screw as a screw rotates within the barrel. The controller 50 thus also preferably thus adjusts the hydraulic pressure to the motor 33 which rotates the screw. Screw rotation may be controlled to the minimum required to achieve high quality of plasticizing material and to deliver a homogenous mix of plasticized material to the mold at a lower cost. Rotation of the screw within the barrel thus results in mechanical shearing of the plastic material, which is typically pelletized, thereby heating the material for injection into the mold. Controlled hydraulic pressure is thus preferably used to rotate the screw and thereby plasticize the material so that it is ready for injection into the mold. The controller 50 may thus regulate hydraulic pressure to rotate the screw to achieve the minimum hydraulic pressure required to rotate the screw to achieve the desired plasticity for the injected material. The molding machine 10 may also be provided with an injection carriage cylinder 38, as shown in FIG. 1.

The controller thus may simultaneously send signals in response to the position sensor 31 to control the speed of the motor 62, to control the clamp pressure control valve 53 for controlling the clamping force to the clamping mechanism 20, to control the injection pressure control valve 54 to control the pressure supplied to the motor 33 which rotates the screw, and to control pressure to the carriage cylinder 38. Fluid pressure to cylinder 38, which controls the position of the injection nozzle relative to the closed mold, may be automatically increased or reduced as a function of clamping pressure according to the requirements of the molded part to further reduce the electricity needed to operate the molding machine. The use of proportional valves in combination with the low cost, fixed displacement pump 60 with a DC motor 62 with a variable speed drive thus provides a highly reliable yet simplistic molding machine control system. The controller 50 may be coupled to a display screen 49 for displaying machine operating information. A keyboard may be provided for allowing the operator to input relevant data to the controller, or the screen may be a touch screen to accomplish that purpose.

The prior art techniques utilize high energy during the injection portion of the cycle, and also are inefficient during the screw backout or recovery portion of the cycle. After the plasticized material fills the mold and the gate solidifies, the hydraulic drive motor which rotates the screw member is rotated in most molding machines so that the screw moves axially backward due to the force of the plasticized material acting on the rotating screw. During this screw backout phase, hydraulic power to the drive motor rotates the screw within the remaining plasticized material in the barrel, with the result of this screw rotation moving the screw in a backward position. In many applications, the screw is subsequently moved axially further backward to decompress the plasticized material before starting the injection portion of the next cycle. Very little energy is required to pull the cylinder and the screw axially back to the starting position.

Figure 4:
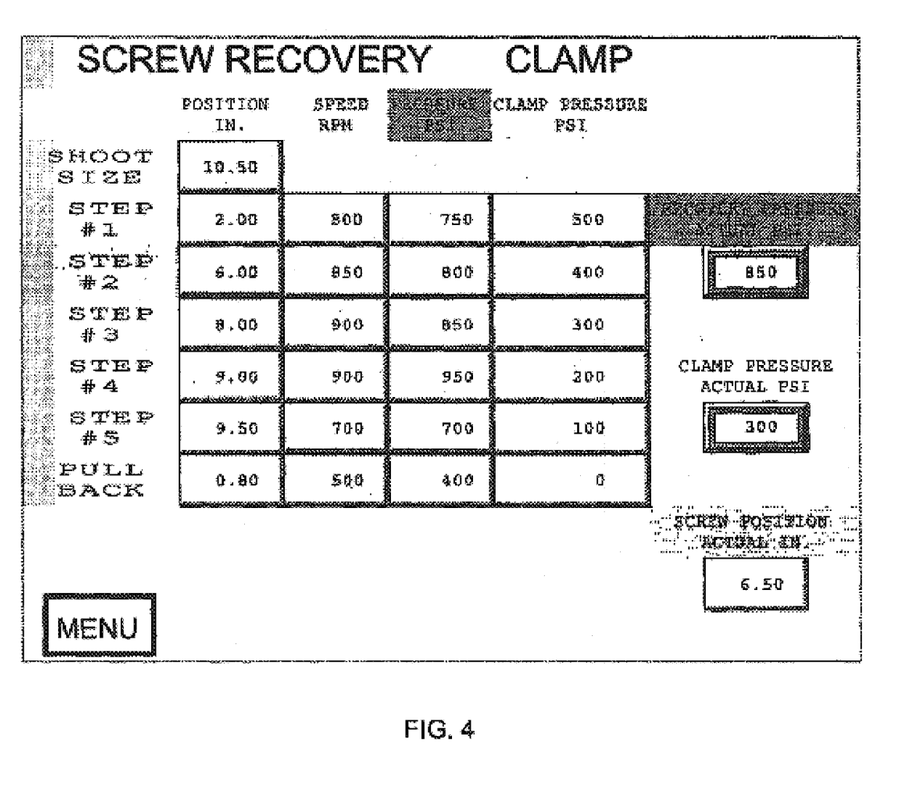
FIG. 4 is an exemplary stream depicting similar data for the back-out screw rotation portion of the cycle.

According to the present invention, both the clamping mechanism and the hydraulic motor which rotates the screw are preferably controlled by the controller 50, with hydraulic pressure to both the screw rotation motor and to the clamping mechanism being controlled again as a function of the axial position of the screw within the barrel. As the screw rotates and is pushed backward, the clamping pressure may be reduced (or dropped completely according to the requirements of the molded part) as a function of the position of the screw, as evidenced in the FIG. 4 illustration. In a preferred embodiment wherein the hydraulic motor is also controlled by the controller 50, and most importantly with the controller 50 controlling the hydraulic motor during this backout of the screw member, controller 50 significantly reduces energy consumption by controlling fluid pressure to the motor in response to signals from the position sensor 31, thereby utilizing only the energy necessary to achieve the desired objective.

The molding machine discussed above involves a hydraulically powered injection molding machine. The present invention may also be used, however, to allow an electric molding machine which may include one or more variable speed electric motors for achieving linear movement of the screw and the clamping mechanism, and also variable speed electric motors for torque control, i.e., to rotate the screw. The molding machine may thus include a plurality of variable speed electric motors, with each motor being controlled by the controller 50. The rotational output from a variable speed electric motor may be converted to linear motion to close or open the clamping mechanism, to inject the mold material into the mold, and to perform other axial movements as described, with the controller 50 being responsive to the axial position of the screw within the barrel as related by position sensor 31. All electric molding machines may include a various rack and pinion mechanisms and/or ball screw drives and/or belts for converting rotational motion to linear motion.

A variable speed electric motor may also be used to rotate the screw to plasticize the material, and another variable speed electric motor may be used to move the screw axially during an injection stroke of the cycle. One or more variable speed electrical motors may be used to bring the mold parts together and apply the clamping force needed to mold the desired part. Controller 50 may thus send signals to different motor drives in response to the position sensor 31 to accomplish the objectives discussed above for either a hydraulically powered molding machine or an electrically powered molding machine. The present invention may also be used in a hydro-mechanical clamping molding machine, such as toggle, hydro blocks, pancake or other mechanical mechanism for clamping a two part mold.

Figure 5:
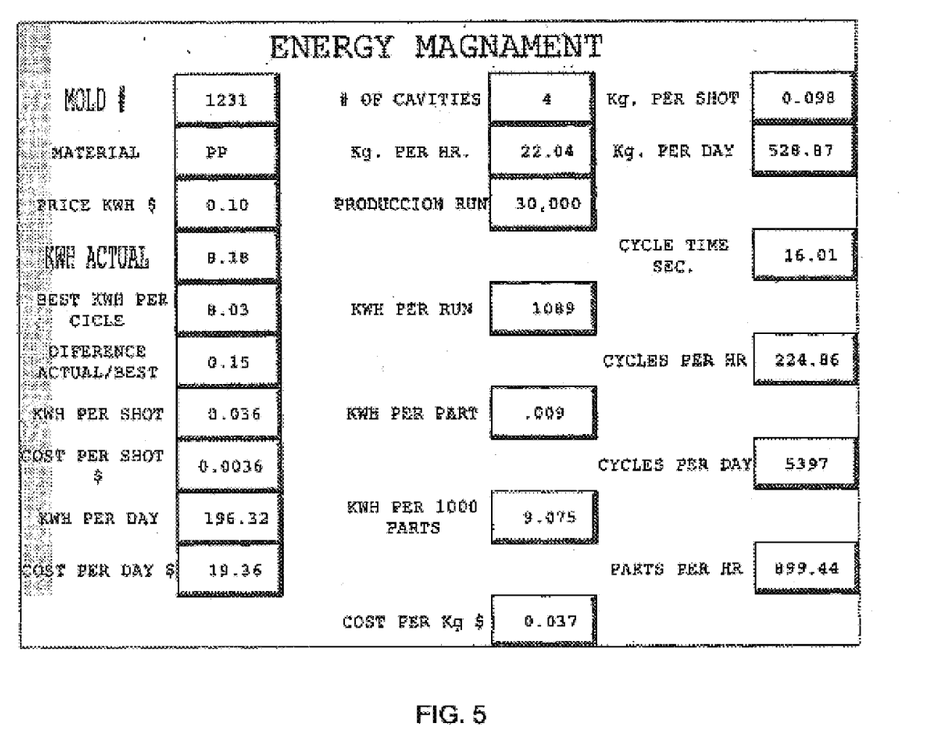
FIG. 5 is an exemplary energy and efficiency management chart, indicating information available to a molding machine operator.

FIG. 5 depicts a chart, which preferably may be displayed to the molding machine operator, which indicates for a particular machine and a particular mold data relating to both the energy management of the molding machine and the efficiency of the molding machine operation. The present invention, particularly when used in conjunction with a real time display chart as shown in FIG. 5, should be significant to achieving the desirable features of the invention.

Figure 6:
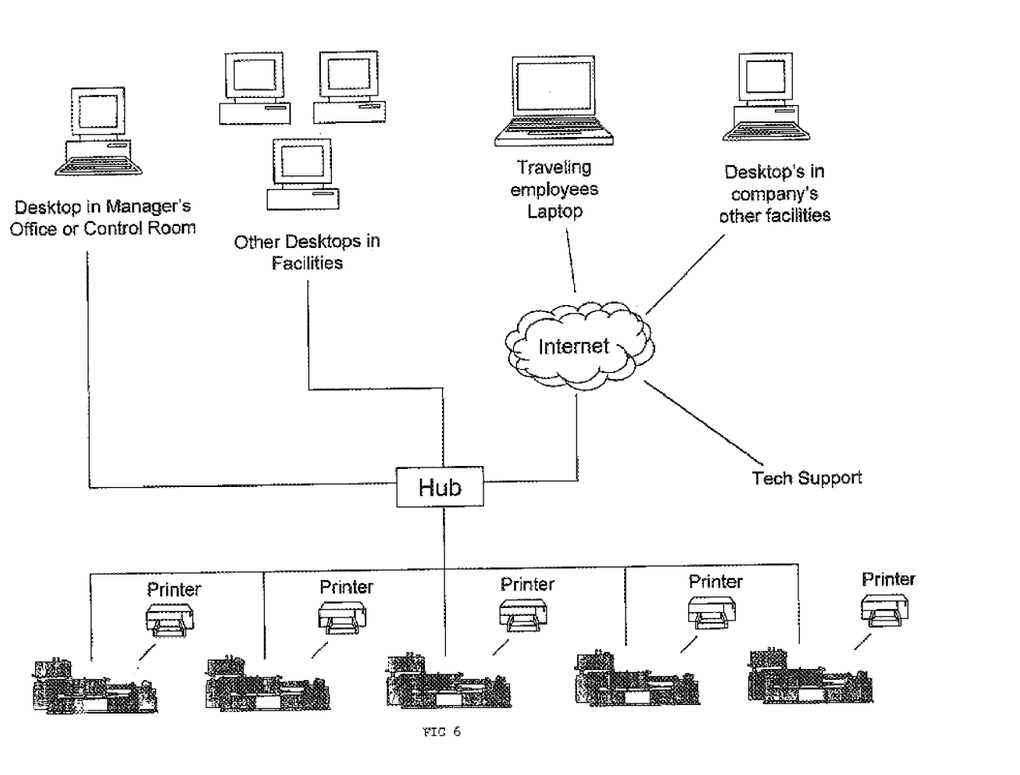
FIG. 6 is an exemplary diagram illustrating multiple molding machines, within signals from each machine forwarded to a central hub, and then to various displays adjacent or remote from the molding machines.

FIG. 6 discloses a system with multiple molding machines interconnected with various displays adjacent to or remote from the molding machines. These communication links between the molding machines and computers provide valuable management information and control, allow for remote corrective action of any molding conditions on any molding machine, and enable remote molding machine diagnostics and corrective action.

The present invention recognizes that the proper set up of an injection molding machine will depend upon the particular mold, and the particular machine in which that mold is placed. A review of different molding machines with different tonnage clamp rates, with different injection volumes and different injection force tonnage, indicates that the ratio of the clamping tonnage to the injection tonnage varies widely for the same size machine. Machines studied varied clamp tonnage varying from 150 tons to 1,000 tons. The ratio of clamp tonnage to injection tonnage for the same size machine may vary by a factor of two or more, depending upon a particular machine and, as previously stated, a particular mold. The present invention optimizes the efficiency of the injection process by recognizing the particular features of each mold and each molding machine, and achieving a relatively fast injection rate, which allows a relatively low molding temperature, and also allowing for a relatively low clamping pressure (and possibly a lower tonnage molding machine), and also allowing for a low injection pressure. Energy consumption is minimized by adjusting the hydraulic pressure and hydraulic flow applied to the clamping mechanism as a function of the position of the screw during both the injection portion of the cycle and during the screw back-out rotation portion of the cycle.

By using the controller of the present invention, the cycle time required for preferably injecting a molded part may drop significantly from, e.g., 12 seconds to 7 seconds. In other applications, the cycle time may be reduced from, e.g., 61 seconds to 41 seconds. The molding machine may use considerably less power, and typically in the range of one half to 90% less power, than a conventional molding machines, in order to manufacture the same molded part. Since less energy is used, smaller electric motors and pumps may be used, thereby reducing the cost of manufacturing the molding machine.

A significant feature of the present invention is the simplicity of the injection mold controller. The controller need not rely upon complicated equations, or on pressure sensors and other sensors and monitors which utilize valuable time to transmit their monitored condition to the controller, to process the controlled information, and then to actuate a component of the molding machine to accomplish a desired task. As disclosed herein, the position of the screw during the injection phase may be monitored in six different stages, although those skilled in the art will appreciate that various numbers of multiple stages may be used, depending on the desired accuracy. The disclosure of six positions followed by a clock-off and a hold down position are thus representative only of one embodiment. Similarly, the position of the screw during the backout screw rotation portion of the cycle may be monitored by the same position sensor, which may include a five stage sensor as disclosed herein, but also may include more or less stages. In a preferred embodiment, an axial screw position sensor may easily update the computer at any desired time of the axial position of the screw within the barrel, and the controller may select those signals desired to reliably control the molding machine during the complete cycle. A feature of the invention is that the position sensor may be very simple, highly reliable, and send signals to the controller in real time. Moreover, in response to those signals, the controller preferably operates a variable speed motor as disclosed herein to vary the output of the injection mechanism 30 and the clamping mechanism 20. Clamping pressure is thus varied as a function of the screw position. One may also use a preset value for the clamping pressure as a function of the injection pressure or the screw position, with the injection portion to axially move the screws controlled by controller 50 so that each molding machine may be optimized for a particular mold to obtain the highest possible efficiency for that combination. Once the machine and the mold are properly set up, the mold operator is allowed to vary set up positions, depending on various factors and information received during the run process. This information may also be used to allow a scheduler to optimize output by maximizing the molding machine for a particular mold to result in the highest production of quality parts.

A particular feature of the present invention is that the controller may use a PC or PLC based computer able to process both analog and/or digital signals. An operator interface may be provided by a key panel, and may also be provided by a touch screen, thereby incorporating in the operator interface a monitor to depict various information input by the set up operator or altered by the molding machine operator. The user interface thus allows the user, at various stages of the cycle and in response to the axial position of the screw, to increase or decrease the clamping force or the injection pressure to axially move the screw to optimize efficiency while producing a quality part. Various mechanisms may be used to allow the molding machine operator to compare the set up information to the current information, so that the mold operator can thereafter alter performance to maximize efficiency for that particular machine using that particular mold under the present operating conditions. When maximum operating efficiency is reached, all the set up information may be stored in the memory of the controller to be used in the future when the same mold goes back on that machine. A multitude of mold recipes may be stored on the memory of the controller, or on an additional memory computer interconnected with the controller.

Those skilled in the art will appreciate the features of the present invention allow for the manufacturer to improve the molding machine, and may also allow for the marketing of a controller to update and rebuild an existing molding machine.

While preferred embodiments of the present invention have been illustrated in detail, it is apparent that modifications and adaptations of the preferred embodiments will occur to those skilled in the art. However, it is to be expressly understood that such modifications and adaptations are within the spirit and scope of the present invention as set forth in the following claims.

What is claimed is:

1. A method of controlling an injection molding machine for producing a molded part by injection of a material into a two part mold, the injection molding machine including a clamping mechanism for applying a mold clamping force to the two part mold and for moving the mold parts apart to open the mold, an injection mechanism for plasticizing the material and injecting the plasticized material into the closed mold forming the molded part, the injection mechanism including a screw member rotatable within and axially moveable within a barrel having a discharge end in fluid communication with the closed mold, the injection mechanism including a drive for rotating the screw mechanism and another drive for axially moving the screw member, the method comprising:

applying a mold clamping force to the two part mold to hold the mold closed and to move the mold parts apart to open the mold;

plasticizing the material and injecting the plasticized material into the closed mold to form the molded part by moving a screw member axially within a barrel, the mold clamping force continuously holding the two part mold closed while plasticized material is injected in the closed mold;

detecting the axial position at the screw member within the barrel during an injection portion of the cycle; and powering the clamping mechanism in response to the detected axial position of the screw member within the barrel to increase clamping pressure during an initial injection phase of the cycle.

2. A method of controlling an injection molding machine as defined in claim 1, wherein the clamping pressure is automatically varied as a function of time during a final injection phase of the cycle, such that the plasticized material packs and solidifies in the two-part mold.

3. A method as defined in claim 2, wherein the controller varies clamping pressure during the final injection phase of the cycle as a function of time subsequent to initiation for the final injection phase of the cycle.

4. A method as defined in claim 1, wherein a hydraulic system is coupled to the clamping mechanism and the injection mechanism.

5. A method as defined in claim 1, wherein the controller anticipates a minimum clamping pressure required to satisfactorily retain the plasticized material within the mold cavity as a function of the axial position of the screw member in the barrel.

6. A method as defined in claim 1, wherein a hydraulic system for controlling the clamping mechanism is powered by one or more positive displacement pumps driven by one or more variable speed motors.

7. A method as defined in claim 1, further comprising: the controller regulating power to a drive motor to rotate the screw during a screw backout phase of the cycle in response to the axial position sensor.

8. A method as defined in claim 1, wherein the controller controls power to a drive motor to rotate the screw during a plasticizing phase of the cycle.

9. A plastic molding machine for producing a molded part by injection of a material into a two-part mold, the plastic molding machine comprising:
   a clamping mechanism for applying a mold clamping force to the two-part mold and for moving the mold parts apart to open the mold;
   an injection mechanism for plasticizing the material and injecting the plasticized material into the closed mold forming the molded part, the injection mechanism including a screw member rotatable within and axially moveable within a barrel having a discharge end in fluid communication with the closed mold, the injection mechanism including a drive for rotating the screw mechanism and another drive for axially moving the screw member, the clamping mechanism continuously holding the two part mold closed during the injection of plasticized material into the closed mold;
   an axial screw position sensor for outputting signals indicative of the axial position of the screw member within the barrel; and
   a controller to operate the clamping mechanism in response to the axial screw position sensor, the controller automatically increasing clamping pressure in response to axial movement of the screw member within the barrel during an initial injection phase of the cycle, such that air escapes from the mold cavity as a plasticized material flows into the mold cavity during the initial injection phase of the cycle.

10. A molding machine as defined in claim 9, where the controller automatically varies clamping pressure as a function of time during a final injection phase of the cycle, such that the plasticized material packs and solidifies in the two part mold.

11. A molding machine as defined in claim 10, wherein the controller varies clamping pressure during the final injection phase of the cycle as a function of time subsequent to initiation of the final injection phase of the cycle.

12. A molding machine as defined in claim 9, wherein the controller anticipates a minimum clamping pressure required to satisfactorily retain the plasticized material within the mold cavity as a function of the axial position of the screw in the barrel.

13. A molding machine as defined in claim 9, wherein air is bled through a gap between mating faces of the two part mold.

14. A molding machine as defined in claim 9, wherein air is bled through one or more ejector throughports from the mold cavity, each ejector throughport having a cross-section greater than a cross-section of an ejector pin member moveable within a respective ejector port.

15. A molding machine as defined in claim 9, wherein the clamping mechanism is coupled with a hydraulic system powered by one or more positive displacement pumps driven by one or more variable speed electric motors controlled by the controller.

16. A molding machine as defined in claim 15, wherein the one or more variable speed motors includes a DC motor with a sinusoidal wave drive.

17. A molding machine as defined in claim 9, wherein the injection mechanism is coupled with a hydraulic system powered by one or more positive displacement pumps driven by one or more variable speed electric motors controlled by the controller.

18. A molding machine as defined in claim 17, wherein the controller controls hydraulic fluid pressure to the clamping mechanism as a function of hydraulic fluid pressure to the injection mechanism.

19. A molding machine as defined in claim 9, wherein the controller controls hydraulic power to the clamping mechanism during the screw return phase of the cycle in response to the axial screw position sensor.

20. A molding machine as defined in claim 19, further comprising:
   a hydraulically powered drive motor for rotating the screw member; and
   the controller controlling hydraulic power to the drive motor during a screw return phase of the cycle in response to signals from the axial screw position sensor.

21. A molding machine as defined in claim 20, further comprising:
   a hydraulically powered drive cylinder for axially moving the screw member within the barrel; and
   the controller controls hydraulic power to the drive cylinder during an injection phase of the cycle.

22. An injection molding machine controller for producing a molded part by injection of a material into a two part mold, the injection molding machine including a clamping mechanism including one or more clamping cylinders for applying a mold clamping force to the two part mold and for moving the mold parts apart to open the mold, and an injection mechanism for plasticizing the material and injecting the plasticized material into the closed mold to form the molded part, the injection mechanism including a screw member rotatable within and axially moveable within a barrel having a discharge end in fluid communication with the closed mold, the injection mechanism including a hydraulic motor for rotating the screw mechanism and an injection cylinder for axially moving the screw member, and a hydraulic system powering the clamping mechanism, the controller comprising:
   an axial screw position sensor for outputting signals indicative of the axial position of the screw member within the barrel;
   a controller coupled with the hydraulic system for supplying hydraulic fluid to operate the clamping mechanism in response to the axial screw position sensor, the controller automatically increasing clamping pressure in response to axial movement of the screw member within the barrel during an initial injection phase of the cycle, such that air escapes from the mold cavity as a plasticized material flows into the mold cavity during the initial injection phase portion of the cycle, the controller operating the clamping mechanism to continuously maintain the mold closed while plasticized material is injected in the closed mold.

23. A controller as defined in claim 22, wherein the controller varies clamping pressure during a final injection phase of the cycle as a function of time subsequent to initiation of the final injection phase of the cycle.

24. A controller as defined in claim 22, wherein the controller anticipates a minimum clamping pressure required to satisfactorily retain the plasticized material within the mold cavity as a function of the axial position of the screw in the barrel.

25. A molding machine as defined in claim 22, wherein the hydraulic system is coupled to the injection mechanism for powering the injection mechanism.

26. A molding machine as defined in claim 22, wherein pumps driven by one or more variable speed motors including a DC motor with a sinusoidal wave drive power the clamping mechanism.

27. A controller as defined in claim 22, wherein the controller controls the hydraulic system to vary the injection pressure to the injection cylinder, and the controller sets hydraulic clamp pressure at a selected variance from hydraulic injection pressure during selected portions of an injection cycle.

28. A controller as defined in claim 27, wherein the controller automatically varies hydraulic clamp pressure during portions of an injection cycle according to preselected values from the hydraulic injection pressure.

29. A controller as defined in claim 22, further comprising:
   a hydraulically powered drive motor for rotating the screw member; and
   the controller controlling hydraulic power to the drive motor during a screw return phase of the cycle in response to signals from the axial screw position sensor.

30. A controller as defined in claim 29, wherein the controller controls hydraulic pressure to the clamping mechanism during the screws return phase of the cycle in response to the axial screw position sensor.

31. A controller as defined in claim 22, further comprising:
   a hydraulically powered drive motor for rotating the screw member to plasticize material within the barrel; and
   the controller controls hydraulic power to the drive motor during a plasticizing phase of the cycle.

* * * * *